March 17, 1959 N. L. LEEK 2,878,319

MULTIPLEX TRANSMISSION SYSTEM

Filed June 25, 1957

INVENTOR.

N. L. Leek 2,878,319

MULTIPLEX TRANSMISSION SYSTEM

Nathaniel L. Leek, Bronxville, N. Y.

Application June 25, 1957, Serial No. 667,872

3 Claims. (Cl. 179—15)

Figure 1:
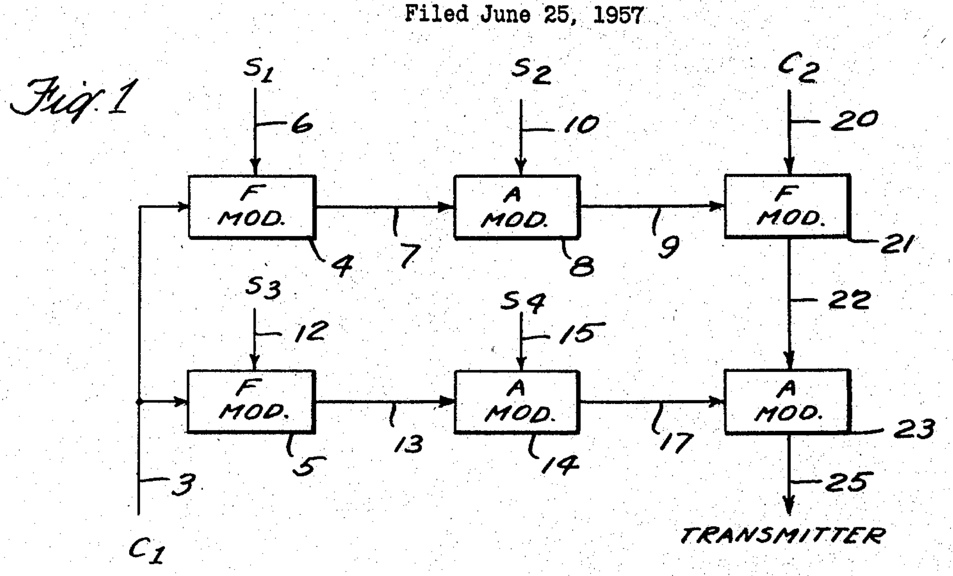

This invention relates to multiplex transmission systems and more particularly to carrier transmission systems wherein a carrier is modulated by a plurality of different signals for simultaneous transmission over a single channel.

An object is to provide a system of the above type having novel and improved characteristics.

Other objects and advantages will be apparent as the nature of the invention is more fully disclosed.

The nature of the invention will be better understood from the following description, taken in connection with the accompanying drawing wherein a specific embodiment has been set forth for purposes of illustration.

Figure 2:
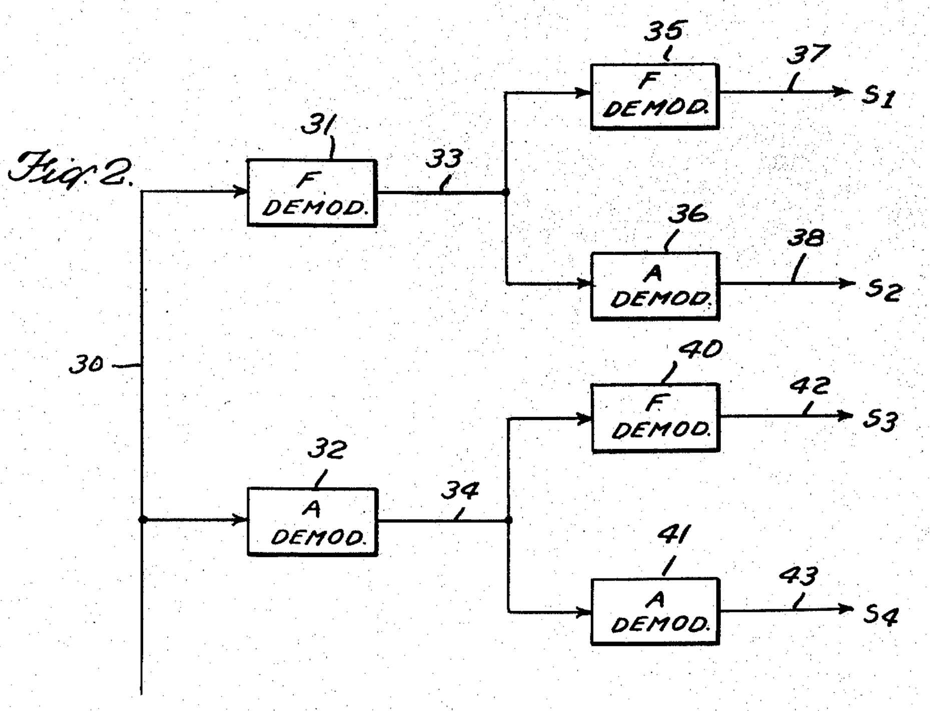

In the drawing:

Fig. 1 is a schematic diagram of a transmitter embodying the present invention; and Fig. 2 is a schematic diagram of a receiver for operation with the transmitter of Fig. 1.

Referring to the drawing more in detail, a sub-carrier $C_1$ of intermediate frequency is supplied over a line 3 to a pair of frequency modulators 4 and 5 which are adapted to frequency modulate the carrier by low frequency signals to produce frequency modulation products. A signal $S_1$ is supplied to the frequency modulator 4 by a line 6. The modulation products are supplied by line 7 to an amplitude modulator 8 which is of the type adapted to produce amplitude modulation sidebands and to feed the sidebands and carrier to an output line 9. A low frequency signal $S_2$ is supplied by line 10 to the modulator 8 for modulating the carrier supplied by the line 7 so that the carrier in the output line 9 carries both frequency and amplitude modulation products.

A third low frequency signal $S_3$ is fed by line 12 to the frequency modulator 5 to produce frequency modulation products which are fed by line 13 to amplitude modulator 14. A fourth low frequency signal $S_4$ is fed by line 15 to the modulator 14 wherein the carrier recived from line 13 is amplitude modulated to produce sidebands and carrier in output line 17. The carrier in line 17 thus carries both frequency and amplitude modulation corresponding to signals $S_3$ and $S_4$ respectively.

A high frequency carrier $C_2$ is fed by line 20 to a frequency modulator 21 to which a modulating signal is supplied by line 9. The modulating signal in line 9 modulates the carrier $C_2$ in modulator 21 to produce modulation products in output line 22.

The line 22 supplies the modulation products of modulator 21 to amplitude modulator 23 which is supplied with a modulating signal from line 17 and is adapted to produce amplitude modulation products in output line 25 which leads to a suitable transmission channel such as a radio transmitter or a closed circuit transmission channel, such as a coaxial cable by which the modulated carrier is transmitted to a distant receiver.

A suitable receiver is illustrated in Fig. 2 wherein the transmitted carrier is transmitted by the transmitter of Fig. 1 and is received from a line 30 and is supplied to first frequency demodulator 31 and first amplitude demodulator 32 which are adapted respectively to derive modulated sub-carriers in lines 33 and 34 corresponding respectively to the modulated sub-carriers in lines 9 and 17 at the transmitter.

The sub-carrier in line 33 is fed to second frequency demodulator 35 and second amplitude demodulator 36 wherein the sub-carrier is demodulated to reproduce signals $S_1$ and $S_2$ in output leads 37 and 38 respectively.

The modulated sub-carrier in line 34 is fed to a third frequency demodulator 40 and a third amplitude demodulator 41 which are adapted respectively to demodulate said sub-carrier and to produce signals $S_3$ and $S_4$ in output lines 42 and 43 respectively.

In the above description the terms "low frequency," "intermediate frequency" and "high frequency" are used in a relative sense only to indicate that the signals, the sub-carrier and the carrier have relatively progressively higher frequency ranges.

It is to be understood that this system may be applied for example to multiplexing a plurality of radio or television signals onto a coaxial cable for subsequent separation and transmission from different broadcast transmitters. Also the system is adapted to be used for the transmission of a plurality of signals over a closed circuit for separation and reproduction at a subscription receiver. In general, the transmitted carrier is amplitude modulated and frequency modulated respectively by two sub-carriers which may be of the same frequency and in turn carry amplitude modulation products and frequency modulation products derived from separate signals.

What is claimed is:

1. A multiplex transmission system comprising a source of a subcarrier, a pair of signal sources, frequency modulation means connected to frequency modulate said subcarrier by signals from one of said sources to produce a frequency modulated subcarrier, amplitude modulation means connected to amplitude modulate said frequency modulated subcarrier by signals from said second source and adapted to produce a first amplitude modulated subcarrier, a second pair of signal sources, second frequency modulation means connected to frequency modulate a second subcarrier from said source by one of said last signals to produce a second frequency modulated subcarrier, second amplitude modulation means connected to amplitude modulate said second frequency modulated subcarrier by a second signal of said last pair to produce a second amplitude modulated subcarrier, a carrier source, a third frequency modulation means connected to frequency modulate said carrier by said first amplitude modulated subcarrier so as to produce frequency modulation carrier products, a third amplitude modulation means connected to amplitude modulate said last products by said second amplitude modulated subcarrier to produce a carrier having both frequency and amplitude modulation products for transmission to a distant receiver.

2. A multiplex transmission system comprising a subcarrier source and a pair of signal sources, means frequency modulating and amplitude modulating said subcarrier by signals from the respective sources to produce a subcarrier carrying frequency and amplitude modulations, a second pair of signal sources, means frequency modulating and amplitude modulating a second subcarrier by signals from the respective sources of said second pair to produce a second subcarrier having frequency and amplitude modulations, a carrier source and means frequency modulating and amplitude modulating said carrier by said first and second modulated subcarriers respectively to produce a carrier having frequency and amplitude modulations for transmission.

3. A multiplex transmitting and receiving system comprising a subcarrier source and a pair of signal sources, means frequency modulating and amplitude modulating said subcarrier by signals from the respective sources to produce a subcarrier carrying frequency and amplitude modulations, a second pair of signal sources, means frequency modulating and amplitude modulating a second subcarrier by signals from the respective sources of said second pair to produce a second subcarrier having frequency and amplitude modulations, a carrier source and means frequency modulating and amplitude modulating said carrier by said first and second modulated subcarriers respectively to produce a carrier having frequency and amplitude modulations for transmission, and a receiver connected to receive said modulated carrier and having first amplitude demodulation means and frequency demodulation means connected to demodulate the received carrier and to reproduce said respective modulated subcarriers, said receiver having second frequency demodulation and amplitude demodulation means connected to demodulate one of said subcarriers to derive therefrom the respective signals of one of said pairs and having third frequency demodulation and amplitude demodulation means connected to demodulate said second subcarrier to derive therefrom signals corresponding to said second pair of signals.

References Cited in the file of this patent

UNITED STATES PATENTS

| | | |
|---|---|---|
| 2,103,847 | Hansell | Dec. 28, 1937 |
| 2,105,849 | Usselman | Jan. 18, 1938 |
| 2,378,298 | Hilferty | June 12, 1945 |
| 2,578,714 | Martin | Dec. 18, 1951 |